United States Patent [19]

Ybarra et al.

[11] Patent Number: 5,208,591
[45] Date of Patent: May 4, 1993

[54] TRACK EXTENSION FOR USE WITH ATCRBS SURVEILLANCE PROCEDURES

[75] Inventors: Kathryn W. Ybarra, Phoenix; Gregory T. Stayton, Glendale, both of Ariz.

[73] Assignee: Honeywell Inc., Minneapolis, Minn.

[21] Appl. No.: 687,965

[22] Filed: Apr. 19, 1991

Related U.S. Application Data

[63] Continuation-in-part of Ser. No. 415,192, Sep. 29, 1989, abandoned.

[51] Int. Cl.⁵ .............................................. G08G 5/04
[52] U.S. Cl. .................. 340/961; 342/29/36; 364/439; 364/461
[58] Field of Search .............. 340/961; 364/439, 461, 364/429; 342/29, 30, 32, 36, 37, 38

[56] References Cited

U.S. PATENT DOCUMENTS

| | | | |
|---|---|---|---|
| 3,849,782 | 11/1974 | Bond | 342/30 |
| 4,003,050 | 1/1977 | Miller | 342/29 |
| 4,417,248 | 11/1983 | Mathews | 342/29 |
| 4,823,272 | 4/1989 | Inselberg | 364/461 |
| 4,853,700 | 8/1989 | Fuhatsu et al. | 342/30 |

*Primary Examiner*—Jin F. Ng
*Assistant Examiner*—Brent A. Swarthart
*Attorney, Agent, or Firm*—Dale E. Jepsen; Donald Lenkszus; Roger Jensen

[57] ABSTRACT

During ATCRBS surveillance procedures, a multiplicity of target aircraft are typically detected through target replies from interrogation signals. However, the nature of the target acquisition procedures are such that positive identification of the target aircraft is not available. Rather than ordering the target tracks with increasing range and correlating the target replies with tracks based on the ordering of the target tracks, the tracks are prioritized, based on confidence in the reliability of the identification of each track, into groups. An attempt to correlate the tracks of each group with the set of target replies is performed for the groups in order of decreasing priority. A target reply is assigned to a track when a correlation between a track and a target reply is determined.

10 Claims, 6 Drawing Sheets

TRACK EXTENSION FOR USE WITH ATCRBS SURVEILLANCE PROCEDURES

This is a continuation-in-part of copending application Ser. No. 07,145,192 filed on Sept. 29, 1989, and now abandoned.

BACKGROUND OF THE INVENTION

1. Field of the Invention

This invention relates generally to aircraft Traffic Alert and Collision Avoidance Systems and, more particularly, to the determination of target aircraft tracks utilizing the Air Traffic Control Radar Beacon System.

2. Description of the Related Art

The increased demands placed on the aircraft flight deck as a result of more complex technology, ever increasing aircraft traffic, and increased demands for safety has brought about a requirement for monitoring of aircraft traffic in a vicinity of an aircraft that includes automatic identification of potential threats to the monitoring aircraft. As a result, aircraft can have transponders associated therewith that, in response to appropriate electromagnetic interrogation signals, provide responding electromagnetic signals. The responding electromagnetic signals include information with respect to the range, altitude, and heading of the interrogated aircraft. Certain Traffic Alert and Collision Systems (e.g., the mode-S system) include target identification as part of the information imposed on the responding electromagnetic signals. For these mode S systems, the identification of the path or track of the responding aircraft is relatively simple, involving time dependent positions and altitudes of an identified aircraft. Similarly, extrapolations or extensions of aircraft tracks can be relatively simple, at least in concept.

In the situation in which the responding electromagnetic signals do not include aircraft identification information imposed thereon, the determination of the aircraft flight path is more complicated. The information obtained by periodic interrogation of a multiplicity of unidentified targets, with associated range, altitude and bearing (heading) information being provided as a result of the interrogation, can be subjected to well known algorithms to provide a target aircraft track, i.e., the path of the target aircraft relative to the monitoring or surveillance aircraft as represented by target aircraft reply communications in response to a interrogation signals from the monitoring aircraft. Once the track is identified, then the extension thereof can be computed to determine if the target aircraft is a threat to the monitoring aircraft.

Figure 1:
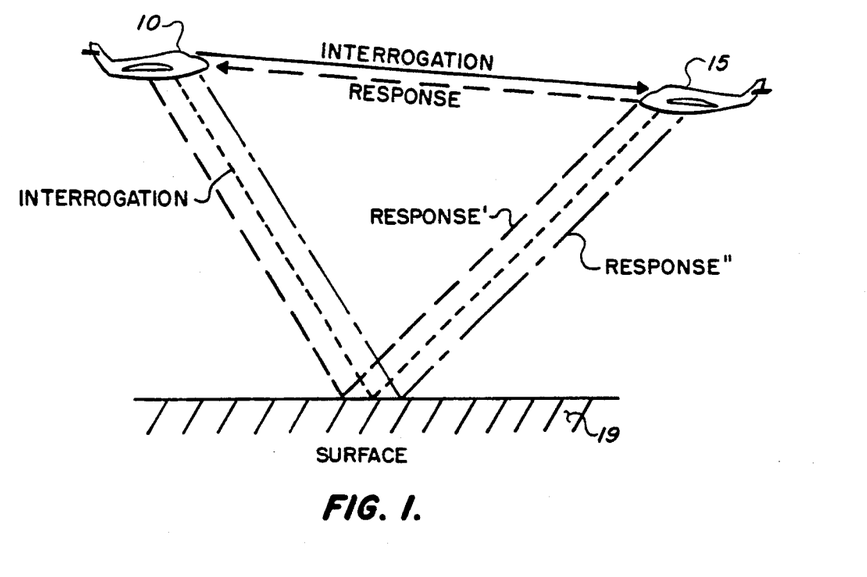
FIG. 1 is a side view indicating how multiple signal paths can occur in the ATCRBS system, the signal paths providing multiple target images for a single target.
Figure 2:
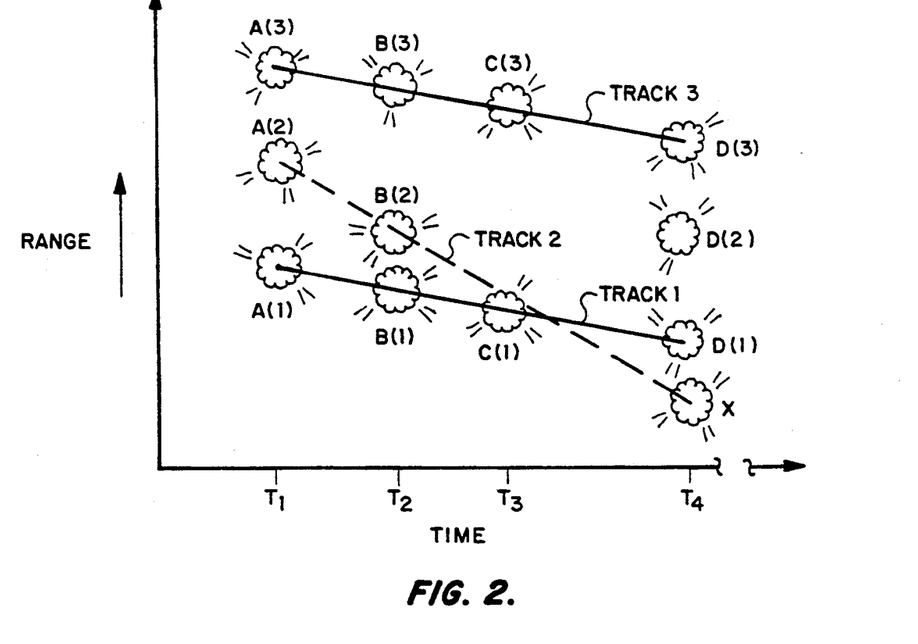
FIG. 2 is a diagram illustrating one circumstance where an erroneous assignment of a target reply to a track can occur.

The track determination is complicated for several reasons, the reasons generally involving spurious target images. For example, referring to FIG. 1, a monitoring aircraft 10 can transmit an interrogation (electromagnetic) signal, INTERROGATION, to target aircraft 15. The transponder in target aircraft 15 provides a response signal RESPONSE. (The delay between the transmission of the interrogation signal and the response signal provides the range information). However, the interrogation signal INTERROGATION can provide a response signal RESPONSE' that is reflected from the earth's surface 19. The RESPONSE' signal, reflected once from the earth is generally referred to as a single bounce multipath signal. Because the length of time for the travel of the RESPONSE' signal is longer than for the RESPONSE signal, the RESPONSE' signal can be interpreted as separate target aircraft at a greater range from the monitoring aircraft. Similarly, an interrogation signal INTERROGATION' signal can reflect off the surface 19 of the earth, activate the transponder of the target aircraft 15 and provide a response signal RESPONSE" signal that also reflects oil the earth's surface. Because both the INTERROGATION' signal and the RESPONSE" signal are each reflected once from the earth's surface, this signal is referred to as a double bounce multipath signal. The RESPONSE" signal will be interpreted by the monitoring aircraft as a target aircraft at a greater range than indicated by the RESPONSE signal or the RESPONSE' signal. FIG. 2 illustrates the situation where a single target aircraft is providing the monitoring aircraft with a plurality of target responses during each interrogation period. FIG. 2 also illustrates another feature of the Air Traffic Control Radar Beacon System. The target image replies (RESPONSE, RESPONSE', or RESPONSE") identified by the monitoring aircraft can be missing. In the algorithms for analyzing tracks, a preselected number of target replies can be missing (e.g., because of electromagnetic interference, apparatus limitations, etc.) and the track algorithms will continue to provide extensions (extrapolations) for the previously identified tracks even in the absence of target replies. After the preselected number of track replies are missing during the periodic interrogation by the monitoring aircraft, the track is no longer considered to be present.

Other spurious replies can be generated, the spurious replies compromising the track generating algorithm. The ATCRBS system can use a Whisper-Shout mode of interrogation in which two interrogation signals of different amplitude are used to interrogate the target aircraft transponders. Between the threshold of the transponders and the suppression (delay) of response when interrogation signals greater than a defined amplitude are received by the transponder, the Whisper-Shout mode provides assistance in separation of target replies, but the Whisper-Shout mode can provide spurious replies.

Multipath tracks that are coasted (extended) can have rats of change that are in excess of the rates of change of true target tracks because of multipath tracks do not have a linear range rate with time, but the multipath tracks are usually extended in a linear manner. Also, if the normal range jitter associated with replies causes a higher than nominal range rate prior to coasting a track, the coasted multipath track will tend to overtake in range the true target track. This effect can have deleterious consequences with respect to track extension of the ATCRBS system. One example of how the track extension can fail is illustrated in FIG. 2. Four sets of interrogation signals are generated by a monitoring aircraft a time $t_1$, $t_2$, $t_3$, and $t_4$. The interrogation signals, in this example, produce multiple target replies associated with each interrogation signal. At time $t_1$, the target replies A(1), A(2) and A(3) are detected. At time $t_2$, the target replies are B(1), B(2), and B(3) are detected. At time $t_2$, three tracks have been recognized by the program, track(1) through target replies A(1) and B(1), track(2) through target replies A(2) and B(2), and track(3) through target replies A(3) and B(3). At the next interrogation time $t_3$, target replies C(1) and C(3) are detected. Track(1) is correlated with target reply C(1), while track(3) is correlated with target reply C(3). Track(2), having no target reply that is correlated therewith, is allowed to "coast", i.e., use the predicted value rather than an actual target reply range measured value for $t_3$ to continue, or extend the track. In this example, the slope of track(2) is greater than the slope of track(1) so that at interrelation period $t_4$, the value of track(2) is predicted to have a lower range value than track(1). At time $t_4$, the target replies that are identified are D(1), D(2), and D(3). In the extension procedure, each target reply is assigned to a track beginning with the smallest range value, the closest potential treat to monitoring aircraft. Following this procedure, the target reply D(1) is assigned to track(2), an assignment which is incorrect and which will require a period of time to recognize and correct.

A need has therefore been felt for a procedure of correlating target replies with tracks in a Air Traffic Control Radar Beacon System which provides less possibility of an erroneous correlation.

FEATURES OF THE INVENTION

It is an object of the present invention to provide an improved Traffic Collision Avoidance tracking technique of aircraft Traffic Alert and Collision Avoidance System transponders.

It is a feature of the present invention to provide an improved Air Traffic Control Radar Beacon System.

It is another feature of the present invention to provide for the extension of target aircraft tracks by giving priority to extending tracks for which confidence in the reliability of the track is high.

SUMMARY OF THE INVENTION

The aforementioned and other features are attained, according to the present invention, by prioritizing the returns in terms of confidence in the reliability of the Previously existing tracks, and correlating newly detected target replies with the existing tracks. The existing tracks can be arranged in order of decreasing priority and the correlation between the detected target replies and the positions determined by track extensions determined for each track group in order of decreasing priority. In this manner, tracks for which confidence is high have a greater likelihood of continuation.

These and other features of the invention will be understood upon reading of the following description along with the drawings.

DESCRIPTION OF THE PREFERRED EMBODIMENT

1. Detailed Description of the Figures

Figure 3A:
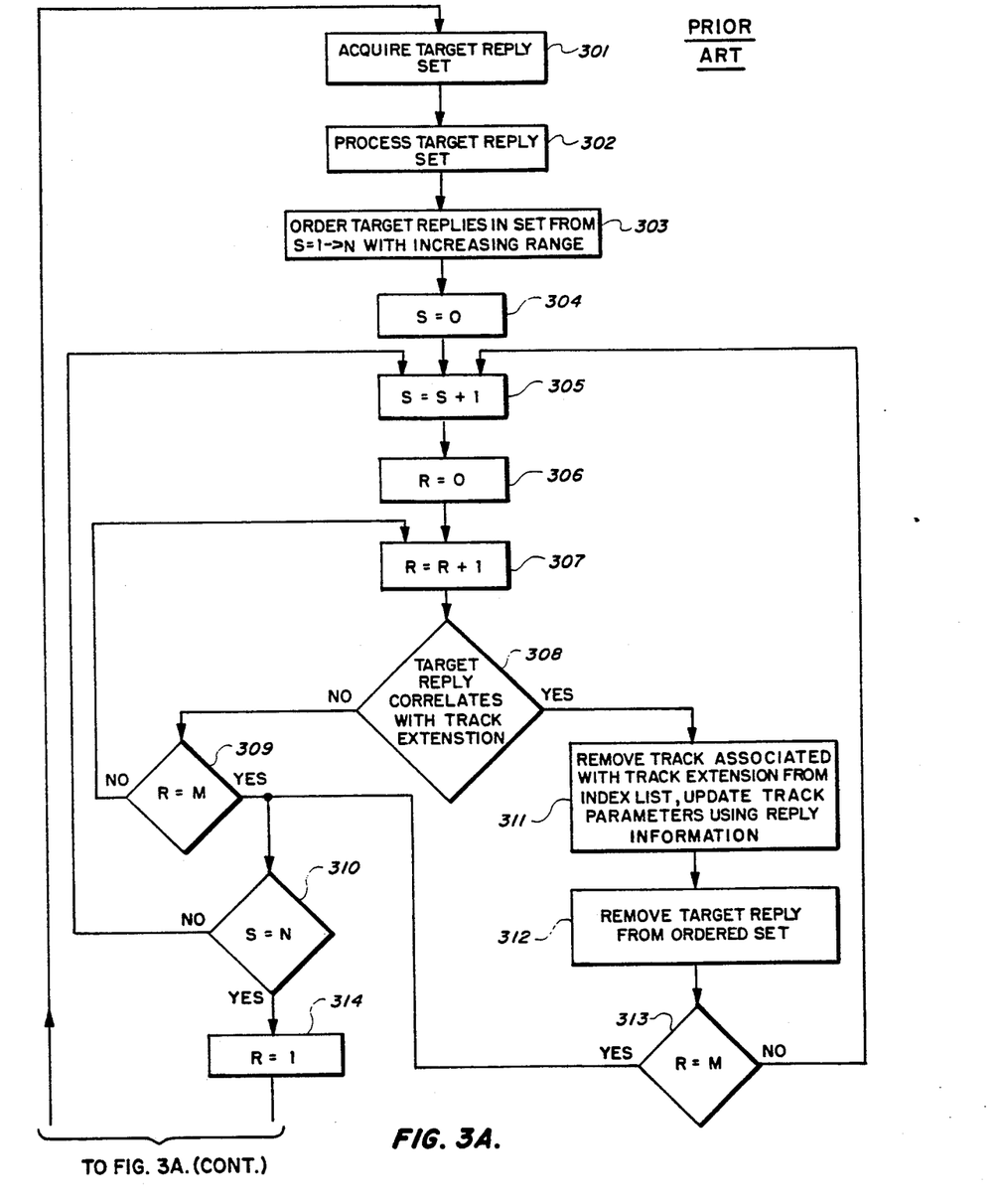
FIG. 3A illustrates the procedure for assigning target replies to target tracks according to the prior art.

Referring to FIG. 3A, the procedure of assigning target replies to target tracks is illustrated. In step 301, a set of target replies is acquired by interrogating the transponders of aircraft in the vicinity of the monitoring aircraft. In step 302, the target replies are processed using various procedures described in MOPS to eliminate as many spurious replies as possible. The remaining set of replies are then ordered with an index s, the order being performed as a function of increasing range in step 303. In step 304 and 305, the index of the target replies is initialized. In step 306 and step 307, an index r, to be described later in the process and which identifies all of the known tracks and calculated track extension points for the period when the current target set is acquired (i.e., in step 301), is initialized. In step 308, target reply with the current target index is compared to the calculated track extension for the current track index. When the comparison is positive, then the detected target reply is made part of the track and the track index is removed from the track index list in 311. The target reply index is removed from the ordered target reply set in step 312. Following step 312, a determination is made whether the track index has reached a maximum value m. When the track index has not reached a maximum value, the procedure returns to step 305 where the target reply index is incremented. When the comparison of step 308 is negative, a determination is made whether the index r is at the maximum value m in step 309. When the comparison in step 309 is negative, the procedure is reentered at step 307 wherein the track index is incremented. When the comparison of step 310 is positive or when the comparison in step 313 is positive, then a comparison is performed to see whether the target reply index s has reached a maximum value n. When the index s is not at the maximum value n, then the process is reentered in step 305 where the target image index s is incremented. When, in step 310, the target image index s has reached a maximum value, then steps 314, 315, 316, 317, 318, 319, and 320 provide that the tracks, for those tracks that have not been removed in step 311, are extended using the calculated extension value; the use of calculated extension values is generally referred to as coasting. However, as required in the MOPS procedure, if the track has been extended by 6 consecutive calculated values, then that track is removed from further computation. In step 321, the target replies that have not been removed from the target reply index list and the similarly remaining unutilized target replies from two previous target reply set acquisitions are processed to see if the points meet the track initiation criteria of the MOPS procedure. The tracks remaining on the index list, the tracks removed by step 311 and the tracks newly identified by step 321 are indexed with the index r from 1 to m in increasing range order.

Figure 3B:
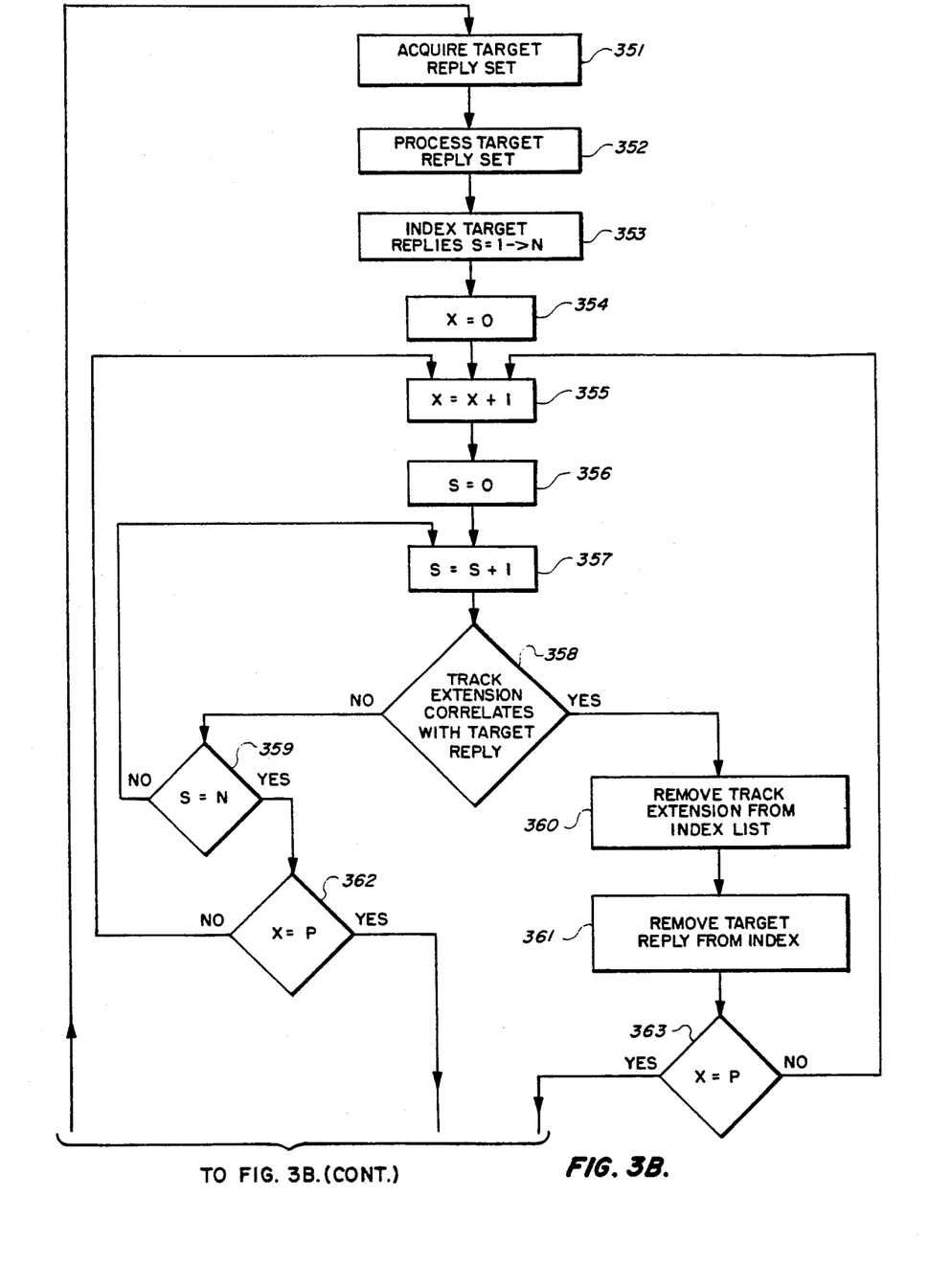
FIG. 3B illustrates the procedure for assigning target replies to target tracks according to the present invention.

Referring next to FIG. 3B, the procedure for determining track extension according to the present invention is illustrated. Steps 351, 352 and 353 are similar to the steps 301, 302 and 303 of FIG. 3A. In step 354 and step 355, the index x is initialized. The index x, as will be clear further in the procedure, is the index for tracks for which the highest confidence is available. In the MOPS procedure, the such tracks are called "established tracks". In step 356 and 357, the index for manipulation of the target replies is initialized. In step 358, a determination is made whether a track extension associated with a track having index x can be correlated with a target reply associated with index s. When the correlation is positive, the track and track extension associated with track having index is removed from the list available for processing in step 360. Similarly, in step 361, the target reply associated with the index s is removed from the target reply list being processed. In step 363, a determination is made to see whether the last track index p of the current track group indexes by x has been reached. When the index p has not been reached, the procedure is reentered at step 355 and the current track group index x is incremented. When the correlation in step 358 is negative, then a determination is made whether the maximum index n for target replies s has been reached. When the maximum value of s has not been reached, then the procedure is reentered at step 357 wherein the track reply index s is incremented. When the maximum value of index s has been reached in step 359, then in step 362 a determination is made whether the track group index x has reached the maximum value p. When the maximum value of p has not been reached, then the process is reentered at step 355 and the track group index x is incremented. When the maximum value of the track group index has been reached in step 36Z or in step 363, then the correlation is made between the remaining target replies and the next highest priority track group in step 364. The procedure will be similar to steps 355 through 363, except for a different group of tracks. When all the tracks (or track groups) have been processed, the calculated track extensions are added to the tracks. In steps 366 and 367, all the tracks for which a calculated extension has been added are examined and, consistent with the MOPS procedure, when the number of consecutive calculated track locations is 6 for a given track, then the given track is expunged from further processing. In step 368, the target replies and the remaining target replies from the two previous target reply set acquisitions are processed to determine if additional tracks have been identified. In step 369, all of the tracks that have been removed in step 360, the tracks identified in step 368, and the tracks remaining in the current list are arranged in prioritized groups, tracks of each group are ordered by increasing range, and the track extension calculated in step 369. In step 370, each of the prioritized groups are provided with a separate index, the illustrated highest priority group being indexed by x.

Figure 4:
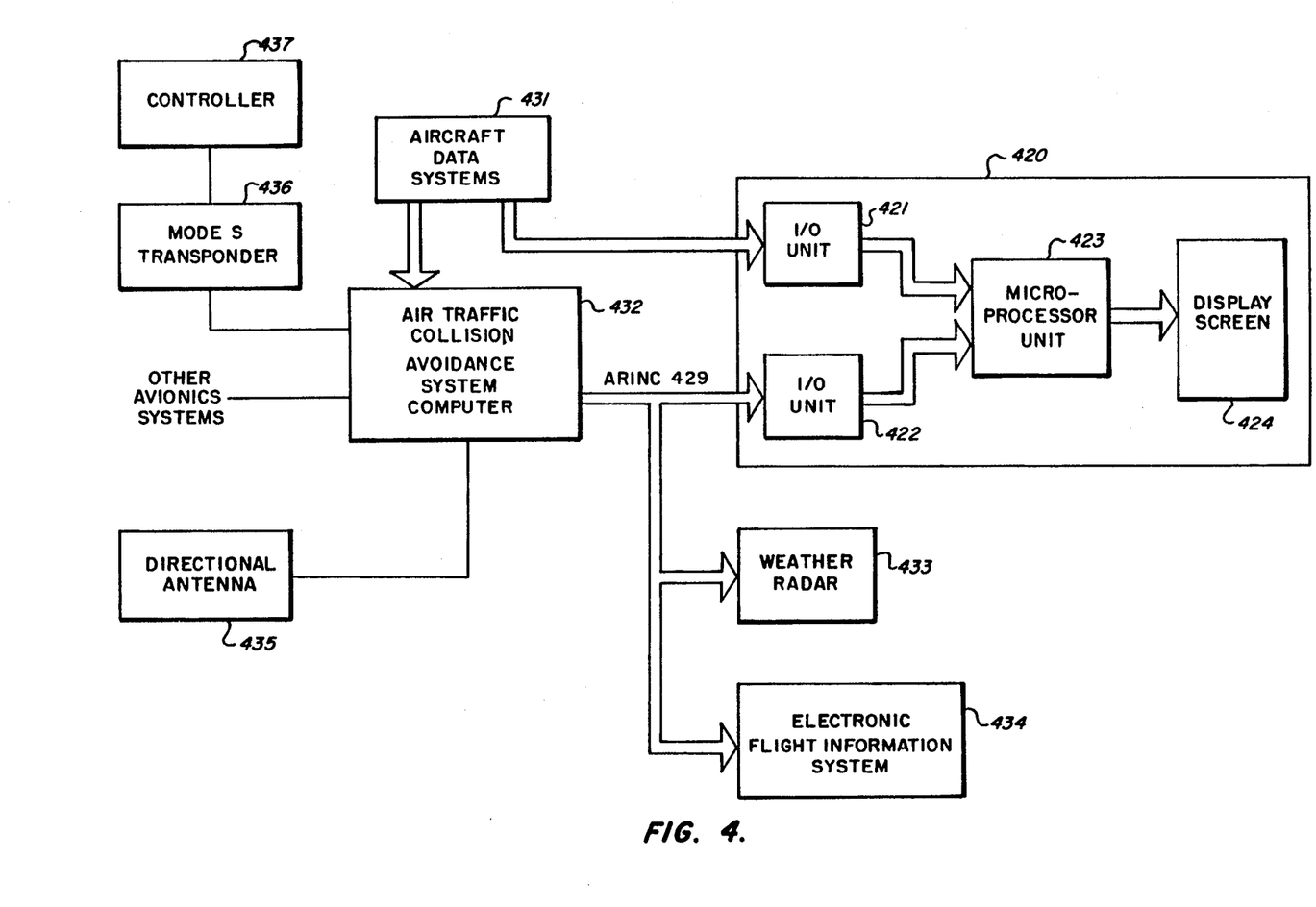
FIG. 4 is a block diagram of the apparatus for identifying target reply signals and for organizing the target reply signal tracks according to the present invention.

Referring next to FIG. 4, the system which can implement the acquisition and processing of target replies according to the present invention is shown. The display unit 420 includes a first I/O unit 421 and second I/O unit 422. The two I/O units 421 and 422 act as buffer units for signals from the avionics apparatus applied to the display unit. The signals from the I/O units 421 and 422 are applied to microprocessor unit 423. In the preferred embodiment, the microprocessor unit 423 is a graphics processor (e.g., Texas Instruments 34010) and is used to provide the signals determining the image displayed on display screen 424. In the preferred embodiment, the display screen includes a high resolution, color liquid crystal display, the liquid crystal display of the preferred embodiment being arranged in a matrix of pixel elements enabled by appropriate row and column driver circuits. The aircraft data systems 431 include the sensors that determine the flight parameters of the aircraft. The signals from the aircraft data systems 431 are also applied to the traffic collision avoidance system computer 432. The avoidance system computer 432 includes apparatus and programs for executing preselected algorithms and programs. In particular, the avoidance system computer 432 includes the stored programs and requisite apparatus for executing the stored programs which process the target reply signals. The avoidance system computer 432 also receives signals from the mode S transponder and the mode C transponder. The mode 8 transponder 426 provides the inter-aircraft exchange of data, each aircraft transmitting flight data. Because the mode S transponder communications include an aircraft identification code, the tracks of aircraft communicating through the mode S transponder can be unambiguously identified. However, aircraft identification information is not included in the mode C transponder communications. Therefore, the present invention is directed to assigning return signals to aircraft flight paths or tracks in order to determine when an aircraft poses a threat to the monitoring aircraft. Interrogation signals from the monitoring aircraft are broadcast by means of directional antenna 425 and the responses from the mode C transponders associated with other aircraft are received by the directional antenna 425. The avoidance system computer 432 compares the data received from other aircraft with the data from the aircraft data systems 431 to determine when a collision is imminent. The avoidance system computer 432 applies signals representing the results of the these calculations to the I/O unit 422 for display on the display screen. The avoidance system computer 432 receives signals from and applies signals to the directional antenna 425 and from other avionics systems. Signals from the avoidance system computer 432 can also be applied to the weather radar 433 and to the electronic flight information system 434.

2. Operation of the Preferred Embodiment

In typical operation, an interrogation signal is transmitted from the directional antenna 425 of the monitoring aircraft. In response to interrogation signals, the transponders of target aircraft return target reply signals to the directional antenna 425. The information contained in the target reply signals does not identify a specific aircraft in the systems to which the present invention is directed, but range, bearing and altitude information is provided in the target reply signals. The target reply signals are returned in sets, each set a result of an interrogation signal. In the avoidance system computer, the prior sets of target replies have been arranged into tracks, each track including target reply signals believed to be associated with a target aircraft. Because the interrogation signals of the monitoring aircraft are broadcast at a known time, providing a time parameter, and because the flight parameters of the monitoring aircraft are known, then it is possible to predict, i.e., by linear extrapolation in the simplest algorithm, the expected position of a target reply signal in response to an interrogation signal for a selected track. The predicted values can then be compared with the target reply signals and signals can be assigned to existing tracks. The present invention does not solely use the typical requirement that the target replies resulting from a transponder interrogation be assigned to tracks beginning with the smallest range. Although the target with the smallest range offers the most immediate threat to the monitoring aircraft, the present technique has the advantage that tracks having a high confidence level will be associated with the newly detected target replies.

The situation is complicated by spurious signals and missing signals. One source of spurious signals has been described above. Missing signals can be the result of electromagnetic interference, uncertainties associated with identifying an unequivocal target reply by the monitoring aircraft, etc. Therefore, tracks are permitted to contain predetermined patterns of missing target reply signals before the associated track is considered too unreliable to be continued. The pattern of identified and missing target reply signals for each track can provide an estimate of the confidence in the track. This confidence is quantified as a priority level in the present invention. The present technique for providing correlations between target replies and aircraft tracks has the advantage of encouraging the continuation of tracks for which confidence is already high. Unreliable tracks are less likely to disrupt the processing by acquiring a target reply belonging to a reliable track. Similarly, fewer target replies are available to maintain unreliable tracks.

As will be well known to those skilled in the art, the operation of aircraft collision avoidance apparatus is governed by the Radio Technical Commission for Aeronautics (RTCA) Minimum Operation Performance Standard (MOPS) for Traffic Alert and Collision Avoidance System (TCAS) manual document number DO-185. This manual provides detailed minimum standards to be met in track determination, track/target reply correlation, signal processing e.g., the identification of duplicated replies), etc.

The MOPS manual identifies a potential track as being initiated when the target replies from three consecutive target reply sets can be correlated in a track. The criteria for the correlation is defined in detail in the MOPS procedure and includes criteria for range and altitude correlation. A newly initiated track is categorized as a potential track. A potential image track is a newly initiated potential track that fails to meet the multipath criteria for an image track, but meets the possible requirements for an image track. An image track is a potential track that meets the multipath criteria for categorization as an image track. An "established track" meets the requirements of a potential track and further receives at least one correlated target reply during the next five consecutive target reply sets. The level of confidence in tracks of these categories is highest for established tracks, then image tracks, then potential image tracks and finally the potential track has the least level of confidence. The levels of confidence are used to prioritize the target reply signals. The set of target reply signals from an interrogation signal is first compared with tracks having the highest confidence level. The target reply signals remaining after assigning correlated target reply signals with the tracks having the highest confidence level are then compared with expected target reply signals for tracks with the next highest confidence level, and, where appropriate, assigned to the correlated track. The process is continued for each confidence level, the tracks to which no target reply signals can be correlated being extended with calculated track extension signals (so designated). After a preselected number of calculated track extensions are used, in the absence of target reply signals, to extend an existing track, the track is removed from the track list(s). The unassigned target reply signals are compared with unassigned target reply signals from previous transponder interrogation events in an attempt to identify previously recognized tracks.

It will be clear that the calculation of a track extension, the ordering of signals based on a selected parameter (e.g., range), the association of a priority value, and the other operations required to implement the procedures of FIG. 3A and FIG. 3B are available in a general purpose data processing system such is found in the air traffic collision avoidance system computer. It will be further clear that, although the present invention is described in terms of a monitoring aircraft, the facility using the procedures described herein need not be so limited, for example, the monitoring of target aircraft can be performed by a ground station.

When the tracks meet certain criteria, the position of the target aircraft relative to the monitoring aircraft is displayed on the display unit. This display provides the flight deck with information concerning air traffic in the vicinity of the monitoring aircraft. In particular, the information relating to air traffic in the vicinity of the monitoring aircraft can be used to resolve or avoid threat situations.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A method of processing aircraft traffic target replies provided in response to interrogation signals from a monitoring aircraft for traffic in a vicinity of said monitoring aircraft, wherein positions of target aircraft traffic are represented by target reply signals in aircraft processing apparatus, said method comprising the steps of:

accumulating sets of target replies, each target reply including a time and a distance parameter, wherein said sets of target replies can include missing and inaccurate target replies;

based on a predetermined criterion for correlation between target reply parameters for a plurality of unassigned target replies, assigning unassigned correlated target replies to a target aircraft track;

based on a preselected relationship between parameters for each correlated target reply of a target aircraft track, determining a priority level for each target aircraft track;

providing an additional set of target replies along with parameters for each additional set of target replies;

assigning an unassigned additional set target reply to a target aircraft track when said additional set target reply has said predetermined criterion for correlation with target replies of said target aircraft track, wherein said assigning an unassigned additional set target reply step is performed in order of priority level of said target aircraft tracks;

accumulating unassigned additional set target replies with sets of target replies previously accumulated; and returning to said providing an additional set of target replies step.

2. The method of claim 1 further comprising the step of including a calculated target reply in a processed target aircraft track when unassigned additional set target replies does not include a correlated target reply prior to said returning step, a target aircraft track being discarded when a preselected number of calculated target replies are included therein.

3. The method of claim 1 further comprising the step of providing with each target reply a bearing parameter.

4. The method of claim 2 wherein said determining step includes a step of associating a priority level with each target aircraft track group selected from the set of groups consisting of an established track group, an image track group, a potential image track, and a potential track.

5. The method of processing tracks for target aircraft in a vicinity of a surveillance aircraft, each track represented by target reply signals provided by target aircraft in response to interrogation signals by said surveillance aircraft, said method comprising the steps of:
periodically acquiring a set of target reply signals, each target reply signal indicating a position of a target aircraft relative to said surveillance aircraft, wherein a set of said target reply signals can include inaccurate target reply signals and can have missing target reply signals;
determining when a first predetermined correlation between unassigned target reply signals of different sets of target reply signals is present;
assigning each of unassigned target reply signals having said first predetermined correlation to a first group correlated track, each first group correlated track having a first level of priority;
repeating said assigning unassigned target reply signals having said first predetermined correlation for unassigned target reply signals until unassigned target reply signals no longer meet said first predetermined correlation;
performing said assigning step and said repeating step for a second predetermined correlation to provide second group correlated tracks having a second priority level;
for each new set of target reply signals, assigning an unassigned new set of target reply signals to a first group correlated track for each first group correlated track when said first predetermined correlation condition is present therebetween, said unassigned new set target signal and said first group correlated track forming an updated new first group correlated track;
after all first predetermined conditions have been identified between said unassigned new set target reply signals and said first group correlated tracks, assigning an unassigned new set target reply signal to a second group correlated track for each second group correlated track when said second predetermined correlation exists therebetween to form an updated second group correlated track; and
returning to said assigning an unassigned new set of target reply signals step.

6. The method of claim 5 further comprising the steps of:
prior to said returning step, assigning unassigned target reply signals and a unassigned new set target reply signal having said first predetermined correlation to a new first group correlated track until said first predetermined correlation is no longer present; and
after all said first predetermined conditions have been satisfied, assigning unassigned target reply signals and a unassigned new set target reply signal having said second predetermined correlation to a new second group correlated track until said second predetermined correlation is no longer present.

7. The method of claim 6 further comprising the steps of:
for first and second group correlated tracks which have not been updated, providing updated first and second group correlated tracks by assigning extrapolated target reply signals thereto; and
for said updated first and said updated second group correlated tracks, determining a group designation from said first and said second predetermined correlation conditions.

8. The method of claim 7 further comprising the step of discarding first and second group correlated tracks having a predetermined number of consecutive extrapolated target reply signals included therein.

9. The method of claim 8 further including the step of:
treating said updated and said new first group correlated tracks as first group correlated tracks;
treating said updated and said new second group correlated tracks as second group correlated tracks; and
returning to said for each new set of target reply signals step.

10. The method of claim 9 further including the step of providing third group correlated tracks determined by a third predetermined correlation with a third priority level, each new set target reply signals for said third group correlated tracks processed in a manner similar to said first and said second group correlated tracks in an order determined by said third priority level.

* * * * *